Dec. 27, 1927.
J. BERG
VISOR
Filed Oct. 18, 1924
1,654,206
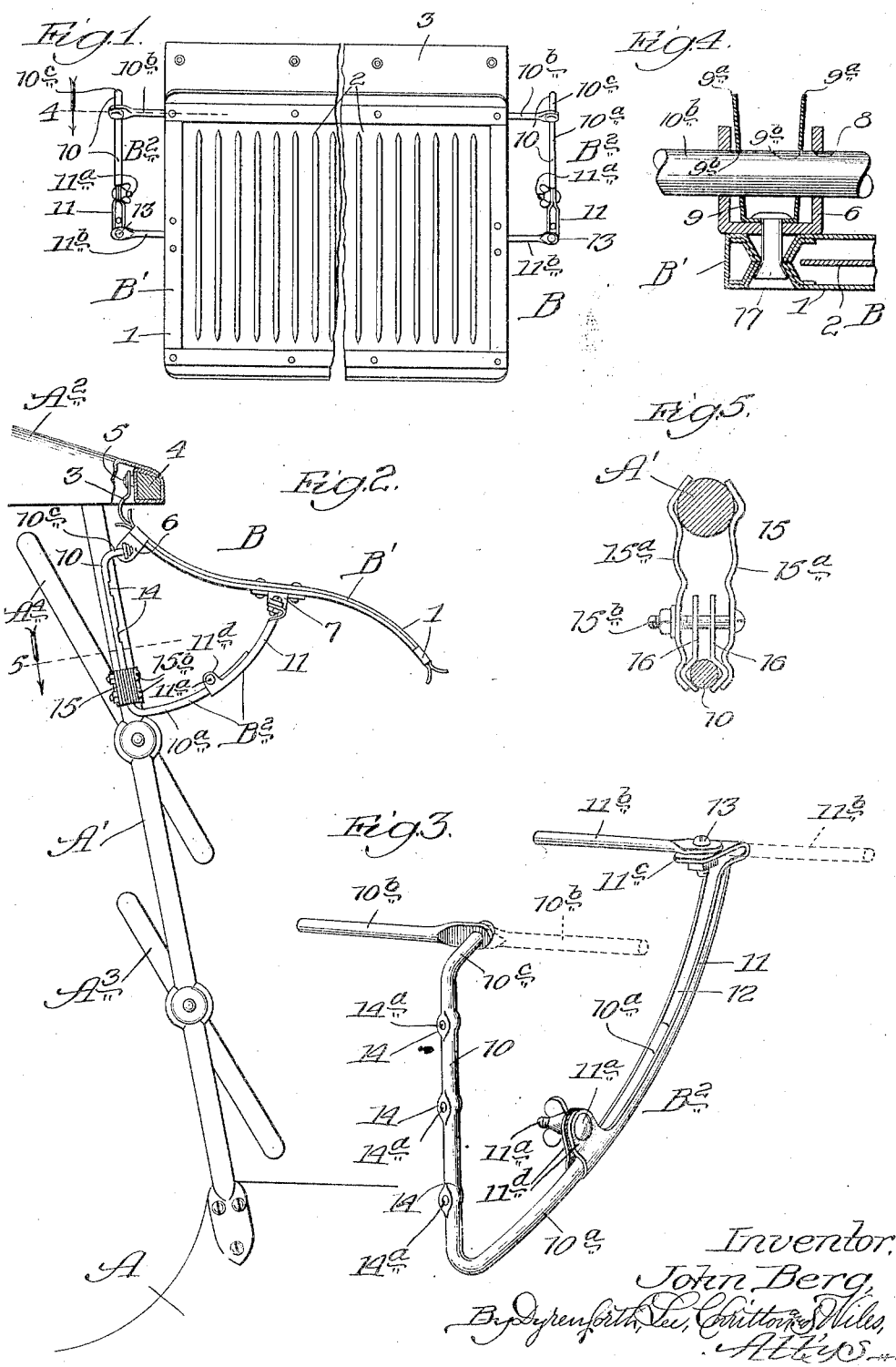
Inventor:
John Berg,
By Dyrenforth, Lee, Chritton & Wiles,
Attys.

Patented Dec. 27, 1927.

1,654,206

UNITED STATES PATENT OFFICE.

JOHN BERG, OF CHICAGO, ILLINOIS, ASSIGNOR TO METAL SPECIALTIES MANUFACTURING COMPANY, OF CHICAGO, ILLINOIS, A CORPORATION OF ILLINOIS.

VISOR.

Application filed October 18, 1924. Serial No. 744,405.

This invention relates particularly to visors for use in connection with automobiles; and the primary object is to provide an improved visor, which is of simple construction and which can be readily applied to automobiles presenting varying widths of body-front, or varying distances between wind-shield posts.

The invention is illustrated in its preferred embodiment in the accompanying drawing, in which—

Figure 1 represents a broken plan view of the improved visor; Fig. 2, a broken view showing the visor applied to the wind-shield posts of an automobile, a portion of the automobile top being shown in section; Fig. 3, a perspective view of one of the brackets employed, the dotted lines indicating reversed position of the pivot-rods, or elongated pivots, employed; Fig. 4, a broken sectional view, on an enlarged scale, the section being taken as indicated at line 4 of Fig. 1; and Fig. 5, a section, on an enlarged scale, taken as indicated at line 5 of Fig. 2.

In the illustration given, A represents a body of an automobile equipped with windshield posts, or standards, A' (one shown), and equipped also with a top $A^2$; and B represents the improved visor mounted on the posts A'.

Between the posts A' are mounted the usual wind-shield sections $A^3$ and $A^4$, which are illustrated in a partially open position.

The improved device B comprises a visor proper B' and a supporting device $B^2$ for each end of the visor.

The visor B' comprises, in the illustration given, a marginal metal frame 1 and a celluloid plate, or plates, 2 supported therein. The visor may, however, be of any suitable construction. In the illustration given, the visor is shown equipped at its rear upper edge with a flexible strip 3 which is adapted to be secured to the front cross bow 4 of the top as by means of screws, or tacks, 5.

Each end member of the frame 1 of the visor is equipped with a pair of bearings, or pivot-guides, 6 and 7, the bearings 6 being disposed near the rear edge of the visor and the bearings 7 being disposed at a point intermediate between the front and rear edges of the visor. These bearings preferably are in the form of U-shaped clips suitably secured to the end members of the frame 1, each bearing being provided with a guide-perforation 8 extending through the flanges of the member and adapted to enable a pivot rod to be slidably adjusted therethrough. At one of the bearings there is preferably provided a U-shaped spring clip 9 provided with perforations through which the pivot may extend.

Each bracket-device $B^2$ preferably comprises a standard 10 having formed integrally with its lower end a forwardly and upwardly extending curved arm, or brace-section, $10^a$; a second brace-section 11 which is of sheath-like form and which telescopically receives the brace-section $10^a$, the lower rear end of the member 11 being equipped with a clamping screw $11^a$; and laterally extending pivot rods, or elongated pivots, $10^b$ and $11^b$ carried, respectively, by the upper end of the standard 10 and the forward end of the brace-section 11.

The standard 10 is shown provided at its upper portion with an integral, forwardly turned extremity $10^c$ upon which the pivot rod $10^b$ is pivotally secured. The brace-section 11 is of arcuate form and of substantially U-form cross section, leaving an open slot 12 at the rear upper side of the member. At its forward end, the member is provided with a rearwardly turned flange $11^c$ which supports a substantially vertical pivot 13 which connects the pivot-rod $11^b$ with the brace-section 11. At the lower rear end of the member 11 are provided ears $11^d$ through which the clamping screw $11^a$ extends. The head of the screw may be non-rotatable in one of the ears $11^d$, and the winged nut with which the clamping screw is provided serves as a ready means for clamping the lower rear end of the sheath-like brace-section 11 to the brace-section $10^a$.

The standard 10 is shown provided with flattened portions 14 having perforations $14^a$ therethrough which may serve to receive screws for securing the standard to the front surface of a closed car body.

The brackets $B^2$ may be mounted on the windshield posts A' by means of clamping devices 15. Each clamping device comprises, in the illustration given, a pair of sheet metal clamping members 15ª provided at opposite ends with suitable jaws, and clamping-bolts 15ᵇ securing the members together. Auxiliary jaws, or fillets, 16 are illustrated, the members 16 being interposed between the standard 10 and the jaws which serve to clamp it. The members 16 are provided with perforations through which the clamping-bolts extend. One or both of the members 16 may be employed, or both may be omitted, depending upon the relation between the diameter of the standard 10 and the diameter of the post A', the purpose of these members is simply to serve as fillets, or, in effect, to enlarge the size of the standard 10 where the post A' is so large as to render resort to these auxiliary devices useful. By keeping the members 15ª substantially parallel a better clamping action is secured.

Where the improved visor is applied, for example, to an automobile whose windshield posts are widely separated, the pivot members 10ᵇ and 11ᵇ are turned inwardly as in the illustration given in Figs. 1 and 2, and this arrangement may be employed notwithstanding variations in the distances between wind-shield posts so long as the standards 10 are so supported by the wind-shield posts as to lie outside of the planes of the bearings 6 and 7 with which the ends of the visor proper are equipped. If, on the other hand, the wind-shield posts are too close together, it becomes necessary to have the pivot-rods 10ᵇ and 11ᵇ extend outwardly. In such case, the brackets are inside of vertical planes containing the end members of the frame of the visor, and the pivot-rods extend outwardly through the bearings 6 and 7. With this disposition of the pivot-members 10ᵇ and 11ᵇ, the pivot-members are nevertheless adjustable through the bearings 6 and 7 to take care of varying distances between the wind-shield posts.

Instead of reversing the pivot-members 10ᵇ and 11ᵇ so that they will extend in the opposite direction as indicated by dotted lines in Fig. 3, the brackets themselves may be interchanged. However, it is preferred to have the pivot-members 10ᵇ and 11ᵇ pivotally mounted, regardless of whether the pivot-members are in practice reversed or whether the brackets are interchanged when it is desired to have the pivot extend outwardly rather than inwardly, or vice versa. By pivotally mounting the pivot-members, they may be more easily adjusted in their bearings, and slight imperfections in the manufacture of the visor as a whole do not interfere with the ready adjustability of the bracket device with relation to the visor proper, or with the adjustability of one brace-section with relation to the other brace-section.

The improved device is exceedingly simple, can be cheaply manufactured, and can be readily applied. The adjustment of the inclination of the visor may be effected by manipulating two clamping screws. The feature of having the rear brace-sections formed integrally with the lower end portions of the standards 10 simplifies and cheapens the manufacture, and this feature in connection with the feature of sheathing the rear brace-section within the front brace-section gives smoothness and continuity and avoids objectionable projections. The improved device, therefore, is simple in construction, readily adjusted, and of very neat appearance.

The shifting of the visor proper upon the pivot-members 10ᵇ and 11ᵇ is obviated by means of the friction locking device 9 shown in Fig. 4. This device preferably comprises a U-shaped member which has its web secured to the web of the clip, or guide, 6, as by means of a rivet 17, and the arms, or flanges, 9ª are resilient and normally diverge somewhat causing the walls of the perforations 9ᵇ to grip the pivot-member 10ᵇ. When it is desired to withdraw the pivot, the spring jaws 9ª may be pressed together to loosen their grip upon the pivot-rod.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. In combination, a visor provided at each end with a pair of bearings spaced with relation to each other, each bearing having an opening extending therethrough, and supporting devices, each comprising a standard having its lower portion provided with an arcuate brace-section, a second brace-section telescopically receiving and adjustably secured to the first-mentioned brace-section, and pivot-rods pivotally connected, respectively, with the upper end of said standard and the forward end of said second-mentioned brace-section and slidably adjustable through said bearings.

2. In combination, a visor provided at each end with a pair of bearings spaced with relation to each other, each bearing having an opening extending therethrough, and supporting devices, each comprising a standard having its upper end bent and extending forwardly and having its lower end curved and extending forwardly and upwardly and affording a brace-section, a brace-section telescopically receiving said first-named brace-section and equipped with clamping means and provided at its forward end with a rearwardly extending ear, a pivot-rod pivotally connected with said ear and engaging one of said bearings, and a pivot-rod pivotally connected with the forwardly turned extremity of said standard and slidably engaging another of said bearings.

3. A bracket device for the purpose set forth comprising a standard having at one end a forwardly extending extremity affording a pivot and having at the other end an arcuate brace-section, a second brace-section telescopically receiving the first-mentioned brace-section and equipped with clamping means, a pivot-rod pivotally connected with the forward end of said second-mentioned brace-section and a pivot-rod pivotally mounted on the forwardly extending extremity of said standard.

JOHN BERG.